(12) United States Patent
Mayne et al.

(10) Patent No.: US 7,879,300 B2
(45) Date of Patent: Feb. 1, 2011

(54) METHOD AND DEVICE FOR DEPOSITING CARBON NANOTUBES OR NITROGEN-DOPED CARBON NANOTUBES BY PYROLYSIS

(75) Inventors: Martine Mayne, Les Moliéres (FR); Dominique Porterat, Orsay (FR); Frédéric Schuster, St Germain en Laye (FR)

(73) Assignee: Commissariat a l'Energie Atomique, Paris (FR)

( * ) Notice: Subject to any disclaimer, the term of this patent is extended or adjusted under 35 U.S.C. 154(b) by 825 days.

(21) Appl. No.: 10/518,453

(22) PCT Filed: Jun. 24, 2003

(86) PCT No.: PCT/FR03/01944
§ 371 (c)(1),
(2), (4) Date: Jul. 12, 2005

(87) PCT Pub. No.: WO04/000727
PCT Pub. Date: Dec. 31, 2003

(65) Prior Publication Data
US 2005/0287064 A1 Dec. 29, 2005

(30) Foreign Application Priority Data
Jun. 24, 2002 (FR) .................................. 02 07785

(51) Int. Cl.
*D01F 9/12* (2006.01)
*D01C 5/00* (2006.01)
(52) U.S. Cl. ................. 422/307; 423/447.1; 423/447.2; 423/447.3
(58) Field of Classification Search ... 423/447.1–447.3; 123/184.21–184.61; 422/307
See application file for complete search history.

(56) References Cited

U.S. PATENT DOCUMENTS 5,662,086 A * 9/1997 Piccinini ..................... 123/403

(Continued)

FOREIGN PATENT DOCUMENTS

FR 2 707 671 1/1995

(Continued)

OTHER PUBLICATIONS

Mayne, et al., Pyrolytic production of aligned carbon nanotubes from homogeneously dispersed benzene-based aerosols, Chemical Physics Letters 2001; 338: 101-107.*

(Continued)

*Primary Examiner*—Stuart L. Hendrickson
*Assistant Examiner*—Daniel C. McCracken
(74) *Attorney, Agent, or Firm*—Brinks Hofer Gilson & Lione

(57) ABSTRACT

Method for preparing carbon nanotubes or nitrogen-doped carbon nanotubes by pyrolysis, in a reaction chamber, of a liquid containing at least one liquid hydrocarbon precursor of carbon or at least one liquid compound precursor of carbon and nitrogen consisting of carbon atoms, nitrogen atoms and optionally hydrogen atoms and/or atoms of other chemical elements such as oxygen, and optionally at least one metal compound precursor of a catalyst metal, in which said liquid is formed under pressure into finely divided liquid particles such as droplets by a specific injection system, preferably a periodic injection system, and the finely divided particles, such as droplets, formed in this way are conveyed by a carrier gas stream and introduced into the reaction chamber, where the deposition and growth of the carbon nanotubes or nitrogen-doped carbon nanotubes take place.

44 Claims, 9 Drawing Sheets

U.S. PATENT DOCUMENTS

| | | | | |
|---|---|---|---|---|
| 5,697,432 | A | * | 12/1997 | Yun et al. .................. 165/151 |
| 5,945,162 | A | * | 8/1999 | Senateur et al. .......... 427/248.1 |
| 6,884,404 | B2 | | 4/2005 | Anazawa et al. |
| 7,329,398 | B2 | | 2/2008 | Kim |
| 2001/0050219 | A1 | | 12/2001 | Anazawa et al. |
| 2003/0161782 | A1 | * | 8/2003 | Kim ....................... 423/447.3 |

FOREIGN PATENT DOCUMENTS

| | | | |
|---|---|---|---|
| JP | 2001 348215 | | 12/2001 |
| JP | 2002 255521 | | 9/2002 |
| JP | 2002 286014 | | 10/2003 |
| JP | 2004 534715 | | 11/2004 |
| KR | 2002 0025101 | | 4/2002 |
| WO | WO-00/63115 | | 10/2000 |
| WO | WO 00/63115 | * | 10/2000 |
| WO | WO 01/77015 | | 10/2001 |

OTHER PUBLICATIONS

Kamalakaran, et al., Synthesis of thick and crystalline nanotube arrays by spray pyrolysis, Applied Physics Letters 2000; 77(21): 3385-3387.*

Terrones, et al., Novel nanoscale gas containers: encapsulation of N2 in CNx nanotubes, Chem. Commun. 2000: 2335-2336.*

Zhu, et al., Direct Synthesis of Long Single-Walled Carbon Nanotube Strands, Science 2002; 296: 284: 884-886.*

Cassell, et al., Large Scale CVD Synthesis of Single-Walled Carbon Nanotubes, J. Phys. Chem. B 1999; 103: 6484-6492.*

Li, et al., Structure and growth of aligned carbon nanotube films by pyrolysis, Chemical Physics Letters 2000; 316: 349-355.*

Li, et al., Large-Scale Synthesis of Aligned Carbon Nanotubes, Science 1996; 274: 1701-1703.*

Smiljanic, et al., Growth of carbon nanotubes on Ohmically heated carbon paper, Chemical Physics Letters 2001; 342: 503-509.*

Zheng, et al., Chemical Vapor Deposition Growth of Well-Aligned Carbon Nanotube Pattens on Cubic Mesoporous Silica Films by Soft Lithography, Chem. Mater. 2001; 13: 2240-2242.*

Ci, et al., Preparation of carbon nanotubules by the floating catalyst method, J. Mater. Sci. Ltrs. 1999; 18: 797-799.*

Ago, Hiroki, et al., "Dispersion of metal nanoparticles for aligned carbon nanotube arrays", *Applied Physics Letters*, vol. 77, No. 1, pp. 79-81 (Jul. 3, 2000).

Ago, Hiroki, et al., "Gas-Phase Synthesis of Single-wall Carbon Nanotubes from Colloidal Solution of Metal Nanoparticles", J. Phys. Chem. B, vol. 105, No. 43, pp. 10453-10456 (Nov. 1, 2001).

Cao, Anyuan, et al., "An effective way to lower catalyst content in well-aligned carbon nanotube films", *Carbon*, vol. 39, No. 1, pp. 152-155 (Jan. 2001).

Cao, Anyuan, et al., "Synthesis of well-aligned carbon nanotube network on a gold-patterned quartz substrate", *Applied Surface Science*, vol. 181, pp. 234-238 (2001).

Che, R., et al., "Fe2O3 particles encapsulated inside aligned CNx nanotubes", *Appl. Phys. Lett.*, vol. 82, No. 19, pp. 3319-3321 (May 12, 2003).

Database WPI, Section Ch, Week 200273, *Derwent Publications Ltd.*, London, GB (Apr. 3, 2002) (Doc. XP-002232175) KR 20020001392.

Grobert, N., et al., "A novel route to aligned nanotubes and nanofibres using laser-patterned catalytic substrates", *Appl. Phys. A*, vol. 70, pp. 175-183 (2000).

Grobert, N., et al., "Alloy nanowires: Invar inside carbon nanotubes", *Chem. Commun.*, pp. 471-472 (2001).

Huang, Shaoming, et al., "Patterned and Contact Transfer of Well-Aligned Carbon Nanotube Films", *J. Phys. Chem. B*, vol. 103, pp. 4223-4227 (1999).

Kamalakaran, R., et al., "Synthesis of thick and crystalline nanotube arrays by spray pyrolysis", *Appl. Phys. Lett.*, vol. 77, No. 21, pp. 3385-3387 (Nov. 20, 2000).

Kudashov, A. G., et al., "Gas-Phase Synthesis of Nitrogen-Containing Carbon Nanotubes and Their Electronic Properties", *Physics of the Solid State*, vol. 44, No. 4 (2002) pp. 626-629.

Lee, Cheol J., et al., "Diameter-controlled growth of carbon nanotubes using thermal chemical vapor deposition", *Chem. Phys. Lett.*, vol. 341, pp. 245-249 (2001).

Rao, C.N.R., et al., "Large aligned-nanotube bundles from ferrocene pyrolysis", *Chem. Commun.*, pp. 1525-1526 (1998).

Satishkumar, B. C., et al., "Bundles of aligned carbon nanotubes obtained by the pyrolysis of ferrocene-hydrocarbon mixtures: role of the metal nanoparticles produced in situ", *Chem. Phys. Lett.*, vol. 307, pp. 158-162 (1999).

Singh, Charanjeet, et al., "Production of aligned carbon nanotubes by the CVD injection method", *Physics B*, vol. 323, No. 1-4, pp. 339-340 (Oct. 3, 2001).

Wei, B. Q., et al., "Growing pillars of densely packed carbon on Ni-coated silica", *Carbon*, vol. 40, pp. 47-51 (2002).

Zhang, X. Y., et al., "Template synthesis of well-graphitized carbon nanotube arrays", *Materials Science and Engineering*, vol. A308, pp. 9-12 (2001).

Zhu, H. W., et al., "Direct Synthesis of Long Single-Walled Carbon Nanotube Strands", *Science*, vol. 296, pp. 884-886 (May 3, 2002).

Andrews, R., et al., "Continuous production of aligned carbon nanotubes; a step closer to commercial realization", *Chemical Physics Letters*, vol. 303, No. 5-6, pp. 467-474 (Apr. 16, 1999).

Mayne, M., et al., "Pyrolytic production of aligned carbon nanotubes from homogeneously dispersed benzene-based aerosols", *Chem. Phys. Lett* vol. 338, pp. 101-107 (Apr. 20, 2001).

Narducci, D., et al., "Modeling of aerosol-assisted chemical vapor co-deposition of NiO and carbon nanotubes", *J. Phys. IV France* vol. 9, No. 8, pp. 741-747 (Sep. 1999).

* cited by examiner

METHOD AND DEVICE FOR DEPOSITING CARBON NANOTUBES OR NITROGEN-DOPED CARBON NANOTUBES BY PYROLYSIS

The present invention relates to a method and a device for deposition by pyrolysis, more precisely by pyrolysis of a liquid containing at least one liquid hydrocarbon or at least one liquid compound consisting of carbon atoms, nitrogen atoms and optionally hydrogen atoms and/or atoms of other chemical elements such as oxygen, and optionally a metal precursor.

The technical field of the invention may be generally defined as being that of depositing or preparing carbon nanotubes or carbon and nitrogen nanotubes (also referred to as nitrogen-doped carbon nanotubes or "nitrogen-doped" nanotubes) which are preferably multi-walled and most often are mutually aligned.

Carbon nanotubes will generally be referred to in what follows, although it is clear that the following description may also apply to nitrogen-doped carbon nanotubes, and the necessary modifications can be deduced easily by the person skilled in the art as appropriate.

Carbon and nitrogen nanotubes are generally referred to by the terms "CN" nanotubes or nitrogen-doped carbon nanotubes or "nitrogen-doped" nanotubes.

It should firstly be recalled that a carbon nanotube is defined as a concentric roll of one or more graphene layers (tessellation of carbon hexagons). The term SWNT (or single-wall nanotube) will be used when there is a single layer, and MWNT (multi-wall nanotube) in the case of several layers.

Carbon nanotubes are increasingly becoming of interest for various applications in nanotechnology. This is because their unique structure and their dimensions, characterized by a large length/diameter ratio, give them exceptional mechanical and electronic properties. In particular, recent studies show that these nanostructures exhibit a very high tensile strength and that their electrical behavior varies from semiconductive to metallic, depending on their structure.

This is why they can, in particular, contribute to the production of composite materials in order to impart new mechanical and electrical properties to them.

Studies have shown that it is possible to develop nanotube-based composite materials with a polymer matrix in order to make them conductive or magnetic, for example, or nanotube-based composite materials with a ceramic or metallic matrix for mechanical reinforcement, for example.

These applications require significant quantities of nanotubes. However, it is still difficult to obtain large quantities of clean nanotubes. The essential reason involves the production means, which are most often developed on the laboratory scale and which, although they make it possible to obtain nanotubes, they do so with growth kinetics and a low yield, and which lead to the concomitant formation of byproducts such as amorphous carbon and metal particles or the like.

Furthermore, the production of aligned nanotubes, that is to say ones which are not entangled and have a controlled length, is found to be of interest for detailed characterization studies of the properties of nanotubes, as well as for potential applications such as cold cathodes for flat screens, hydrogen storage, solar panels and composites. In this context, one major goal is to develop synthesis methods which can be readily applied to the continuous or semi-continuous scale, and which make it possible to control the production of carbon nanotubes in terms of cleanness, yield, alignment and dimensions.

Various methods are used in order to produce single-wall carbon nanotubes (SWNT) or multi-wall carbon nanotubes (MWNT): these are, on the one hand, physical methods based on the sublimation of carbon and, on the other hand, chemical methods based on the catalytic decomposition of molecules containing carbon.

The physical methods consists in subliming graphitic carbon, optionally in the presence of a metal. They are essentially electric arc methods, laser ablation methods or methods using a solar furnace.

The production yield of these two methods is nevertheless low, they are also fairly expensive and production is difficult to control in terms of the length and diameter of the nanotubes. The nanotubes which are obtained furthermore most often contain a non-negligible quantity of byproducts, such as encapsulated metal particles, fullerenes and a great deal of amorphous carbon, and they are entangled with one another.

The chemical methods most often consist in pyrolyzing carbon sources on metal catalysts, and have great similarities to the method of chemical vapor deposition (CVD). They constitute a straightforward approach which is easier to control and less expensive than the physical methods. However, a large number of these chemical methods also lead to the formation of byproducts in a variable quantity. In order to overcome this drawback and exploit exclusively the properties of nanotubes, it is then necessary to carry out subsequent purification of the product which has been obtained. The various purification treatments cause imperfections at the surface of the nanotubes, thereby modifying some of their properties, as well as an additional production cost.

The first pyrolytic methods to be used consisted in pyrolyzing carbon sources on metal catalysts placed in a boat and deposited beforehand in a furnace. The carbon sources were most often hydrocarbon gases such as acetylene or ethylene, or highly volatile liquid hydrocarbons such as benzene conveyed in the form of a vapor, and the catalysts were either metal powders, namely: most often iron, nickel or cobalt, or organometallic precursors, namely: most often ferrocene.

The products obtained were multi-wall carbon nanotubes, or under certain conditions single-wall carbon nanotubes, which are entangled, covered with a layer of amorphous carbon and mixed with various forms of byproducts, such as encapsulated metal particles and amorphous carbon filaments in a significant quantity.

In the particular case of pyrolyzing hydrocarbon gases such as acetylene, butane or methane in the presence of ferrocene or iron phthalocyanine, it was possible to obtain the first aligned nanotubes [1, 2, 3, 4]. But the synthesis technique involves vaporization of the solid ferrocene or iron phthalocyanine stored in a boat placed in a furnace, and this prevents reproducible and stable vapor delivery rates from been obtained. Even in the form of a vapor, it is likewise difficult to convey these products continuously with a constant delivery rate, and this is a problem for application to continuous or semi-continuous production.

Since then, this pyrolytic method has been modified with a view to producing clean and aligned nanotubes. Two different approaches have been explored for this purpose: the first uses substrates containing the catalyst, and the second employs liquid solutions containing the carbon source and a catalyst precursor.

The first approach consists in preparing substrates by impregnation with a salt of the chosen metal or by organization of a network of catalytic elements, in placing it in a reactor, and in pyrolyzing thereon either a previously vaporized solid carbon precursor [[5]N. Grobert et al.] or a hydrocarbon gas, most often acetylene [for example: [6]H. Ago et al., [7]X.

Y. Zhang et al., [8]Lee et al.] or a solution of xylene and ferrocene [[9]A. Cao et al., [10]B. Q. Wei et al.] or an aqueous solution of phenol or urea nebulized beforehand with the aid of an ultrasonic nebulizer [11].

The nanotubes obtained by most of these authors are "clean" and have a high degree of alignment but their length, which is less than 60 microns, and their growth rate remain small. The substrate preparation is furthermore a time-consuming step presenting a fairly great constraint in the scope of large-scale production.

The second approach consists in pyrolyzing solutions containing a liquid hydrocarbon and one or more organometallic precursors in the absence of a substrate. The advantage of this second approach is that the reactor can be supplied simultaneously with the sources of carbon and catalyst. In the most frequent case of using solutions, the liquid hydrocarbons are aromatic compounds such as benzene or xylene, and the organometallic precursors are metallocenes such as ferrocene or nickelocene. The solution may be introduced in the following forms:

liquid through a capillary of an injection syringe [[12]R. Andrews et al.];

a spray, with the aid of Pyrex® laboratory equipment consisting of a capillary conveying the solution, which capillary is contained in a tube conveying an argon flow used to generate the spray [[13]R. Kamalakaran et al.];

an aerosol, with the aid of an atomizer whose operating principle is identical to that of a paint spraygun [[14]M. Mayne et al., [15]N. Grobert et al.].

All the authors cited above [12-15] report the formation of "clean" and aligned multi-wall nanotubes on the walls of the reactor by using solutions of hydrocarbon/metallocene(s).

Furthermore, colloidal suspensions of metal nanoparticles introduced into a furnace with the aid of a syringe have made it possible to synthesize unaligned single-wall carbon nanotubes [16].

Solutions [12-15] are highly advantageous, easy to use and readily applicable to larger-scale production. In order to be able to envisage such an application, it is necessary to be able to inject the solutions with great flexibility, that is to say to be able to vary the liquid delivery rate in a wide range, control the carrier gas delivery rate independently of the liquid delivery rate, to be able to operate with a controlled pressure in the reaction chamber, and also to be able to use liquids having different physical characteristics.

The system of injection with the aid of a syringe [9, 12] makes it possible a priori to inject a wide range of liquids and also solutions obtained from these liquids. It is a continuous injection system which does not result in the formation of a finely divided liquid, however, and this limits the evaporation capacity. With the liquid being introduced into a first heated region in its liquid form, it is thus impossible to inject sufficiently large quantities because they would not then be fully converted into the vapor form and might in the long term cause clogging of the heated region. This leads to nanotube growth rates which still remain low, for example of the order of 25 to 30 μm/h, which then require a production time of 2 hours in order to produce nanotubes with a length of 50 μm. The liquid reservoir is furthermore in direct connection with the reactor via the capillary of the syringe, which leads to partial heating of the solution, thereby entailing preferential evaporation of the liquid hydrocarbon with respect to the metallocene and, in certain cases, premature thermal decomposition of the reactants. This connection between the capillary of the syringe and the reactor furthermore constitutes a handicap when wishing to operate with a controlled pressure in the reaction chamber.

As regards injection in the form of an aerosol or spray [11, 13, 14, 15], the liquid is conveyed into the reactor in the form of droplets.

These droplets require less energy in order to be converted into the vapor form compared with the liquid injected by the syringe. It is thus possible to vary the density of the aerosol, and therefore the injection rate, in a wider range. Nevertheless, the use of spray generation systems [13-15] based on the principle of atomizing a liquid with a significant gas flow, after the fashion of paint sprayguns, does not make it possible to generate large liquid delivery rates or to independently control the carrier gas delivery rate and the delivery rate of injected liquid or the density of aerosol produced.

Furthermore, these systems available on the market do not make it possible to use all types of solutions, in particular solutions produced using volatile liquids. Conversely, the ultrasonic aerosol generation systems make it possible to obtain larger liquid delivery rates and have the advantage of independently controlling the carrier gas delivery rate and the liquid delivery rate. However, these aerosol generation systems operate correctly for weakly viscous liquids, that is to say ones whose viscosity is typically less than the viscosity of water, and, in the case of solutions obtained from weakly viscous or volatile liquids, the liquid is preferably nebulized and the solid remains in the solution reservoir instead of being conveyed into the reactor with the same concentration as in the solution. For these two types of aerosol generation devices, the chamber containing the liquid is furthermore not isolated from the reactor, which makes it difficult to carry out production with a controlled pressure. Apart from a few modifications, the above study can also be applied to carbon and nitrogen nanotubes.

It is clear from the above that there is a need for a method of depositing, preparing and synthesizing carbon nanotubes or carbon and nitrogen nanotubes which can be readily applied to the continuous or semi-continuous scale, and which make it possible to control the production of carbon nanotubes or carbon and nitrogen nanotubes in terms of cleanness, that is to say absence of byproducts, yield, alignment and dimensions.

There is in particular a need for a method of depositing, preparing and synthesizing by pyrolysis, that is to say according to the phenomenon of catalytic decomposition of liquid hydrocarbons (or a liquid compound consisting of carbon atoms, nitrogen atoms and optionally hydrogen atoms and/or atoms of other chemical elements, this liquid compound being referred to as a "nitrogen compound"), carbon nanotubes (or nitrogen-doped carbon nanotubes) which ensures rapid and selective production of "clean" carbon nanotubes (or nitrogen-doped carbon nanotubes), that is to say ones which are free of byproducts, and control over the disposition, the arrangement in space and the dimensions of these carbon nanotubes or these nitrogen-doped carbon nanotubes.

There is also a need for a method of preparing carbon nanotubes or nitrogen-doped carbon nanotubes involving catalytic decomposition of a liquid hydrocarbon or a liquid compound consisting of carbon atoms, nitrogen atoms and optionally hydrogen atoms and/or atoms of other chemical elements (referred to as a "nitrogen compound") by pyrolyzing a liquid containing the hydrocarbon or the nitrogen compound and optionally the catalyst precursor, which does not have the drawbacks, limitations, defects and disadvantages of the prior art pyrolysis methods and which resolves the problems encountered in the prior art methods.

Further to the problems already mentioned above, these problems are in particular as follows:

- inhomogeneous injection of the solution into the reactor with preferential evaporation of the liquid hydrocarbon or the liquid nitrogen compound and premature decomposition, or side-reactions within the solution;
- the difficulty of using highly volatile or relatively viscous liquid hydrocarbons or liquid nitrogen compounds;
- the difficulty of injecting solutions having variable physical characteristics and therefore having solid precursor concentrations varying in a wide range;
- the impossibility of injection with a high delivery rate while maintaining homogeneity of the concentration of the initial solution.

It is an object of the present invention to provide a method and a device for preparing carbon nanotubes or nitrogen-doped carbon nanotubes which, inter alia, meets the requirements indicated above.

This and other objects are achieved according to the invention by a method for preparing carbon nanotubes or nitrogen-doped carbon nanotubes by pyrolysis, in a reaction chamber, of a liquid containing at least one liquid hydrocarbon precursor of carbon or at least one liquid compound precursor of carbon and nitrogen consisting of carbon atoms, nitrogen atoms and optionally hydrogen atoms and/or atoms of other chemical elements such as oxygen, and optionally at least one metal compound precursor of a catalyst metal, in which said liquid is formed under pressure into finely divided liquid particles, such as droplets, by a specific injection system, preferably a periodic injection system, and the finely divided particles, such as droplets, formed in this way, are conveyed by a carrier gas stream and introduced into the reaction chamber, where the deposition and growth of the carbon nanotubes or nitrogen-doped carbon nanotubes take place.

The method according to the invention is defined fundamentally by the use of a specific injection system or device, which may be continuous or discontinuous but which is preferably a periodic (discontinuous) injection system.

The term periodic generally means that the system carries out the injection discontinuously, opens periodically and preferably operates at a fixed frequency. The opening time and the repetition frequency of this opening are adjustable parameters.

This injection system makes it possible to inject all sorts of liquids, in the form of both solutions and suspensions, and preferably makes it possible to cover a wide range of injection rates.

The injection system is advantageously of the automobile heat engine injector type. The injection system is preferably of the continuous or discontinuous (periodic) automobile heat engine injector type, and this injection system is more preferably discontinuous (periodic); it is also preferably provided with a needle-type valve.

Such an injection system has never been used in the context of preparing, depositing and synthesizing carbon nanotubes or nitrogen-doped carbon nanotubes.

This specific injection system is used and supplied according to the invention with a specific liquid which contains at least one liquid hydrocarbon precursor of the carbon forming the nanotubes which are intended to be synthesized, or at least one liquid compound consisting of carbon atoms, nitrogen atoms and optionally hydrogen atoms and/or atoms of other chemical elements such as oxygen (referred to as a "nitrogen compound"), and optionally at least one organometallic or metal compound precursor of a metal which acts as a catalyst for the preparation, deposition and synthesis of the carbon nanotubes or nitrogen-doped carbon nanotubes.

The use of such a specific injector with such a specific liquid is neither described or suggested in the prior art.

Nothing could lead one to suppose that such an injection system, which is in particular specially designed for liquids such as the fuels for heat engines, could be suitable for the atomization or spraying of a liquid so specific as the liquid defined above, making it possible to deposit carbon nanotubes or nitrogen-doped carbon nanotubes.

Document FR-A-2 707 671 does in fact mention the use of an automobile-type injection system for introducing a solution, essentially containing solid precursors which are dissolved in a liquid and which have very high sublimation temperatures, into a chemical vapor deposition chamber, but the layers being prepared are oxide thin films and the synthesis of carbon nanotubes or nitrogen-doped carbon nanotubes is never mentioned.

Furthermore, the liquid which is converted into the form of droplets in the method of this document consists of highly volatile solvents in which the solid precursors are dissolved.

The solvent is used only to convey the solid precursor to the CVD chamber, and is removed before the—oxide—deposition reaction takes place on the substrate. The solvent does not in any way participate in the synthesis of the layers being prepared, for example the oxide layers being prepared, it does not provide any of the constituent elements of these layers, and it is used only as a passive vehicle or carrier.

In the method of the invention, the liquid hydrocarbon or the liquid nitrogen compound is the precursor of the carbon or the carbon and nitrogen forming the nanotubes, and is therefore in fact a reactant (rather than simply a solvent or passive vehicle) performing a fundamental role, which is decisively involved in the formation of the nanotubes and which provides the essential raw material for the synthesis, deposition and growth of the carbon nanotubes or nitrogen-doped carbon nanotubes.

The liquid hydrocarbon or the nitrogen compound according to the present invention is not removed before the deposition reaction chamber, as the solvent in FR-A-2 707 671 is, it enters the latter and it is its pyrolysis in the presence of the metal catalyst which forms the intended carbon nanotubes or nitrogen-doped carbon nanotubes.

The characteristics of the method of the invention, combining a specific injection system and a particular liquid, converted into the form of finely divided liquid particles such as droplets by said system, make it possible inter alia to provide a solution to the problems of the prior art methods and to meet the requirements as indicated above.

The term "finely divided" liquid particles is intended to mean particles with a size of from a few tenths of microns to a few tens of microns. These particles are preferably in the form of droplets, although other forms may be envisaged.

These particles, in particular these droplets, generally form a mist or a jet of droplets.

The method according to the invention is simple, reproducible and makes it possible to prepare "clean" carbon nanotubes or nitrogen-doped carbon nanotubes, in particular multi-wall carbon nanotubes or nitrogen-doped carbon nanotubes, that is to say ones which are essentially free of byproducts, aligned and have a controllable length.

The method according to the invention can be implemented easily on a large scale in order to produce large quantities of nanotubes.

The nanotubes are obtained with a high yield, for example 200 to 1700%, and the growth rate of the nanotubes is very high, which commensurately reduces the duration of the method which is very short compared with the prior art methods.

The term yield of carbon-based product or carbon- and nitrogen-based (nitrogen-doped) product, or of nanotubes if the overwhelming majority of the carbon-based product or the carbon- and nitrogen-based (nitrogen-doped) product consists of nanotubes, is intended to mean the mass of product obtained compared with the mass of catalyst used during the reaction.

The nanotubes obtained according to the invention are regularly disposed or arranged in space, are generally aligned with respect to one another and are substantially perpendicular to the wall of the reaction chamber. When they are prepared directly in the reaction chamber, for instance a reactor, they generally cover the walls of the reactor uniformly.

When they are deposited on a substrate, their principal axis is generally perpendicular to the plane of the substrate.

The nanotubes obtained, which are of excellent quality from the point of view of cleanness and alignment, may furthermore have very large lengths, for example from one to a few micrometers (for example 1 to 10 μm) up to one to a few millimeters (for example 1 to 10 mm).

Such a length is furthermore obtained rapidly, in a time shorter than that needed with the other methods.

As indicated above, the method according to the invention resolves the problems listed above, inter alia.

In particular, the specific injection system which is preferably of the automobile heat engine injector type, more preferably discontinuous or continuous, and even more preferably provided with a needle-type valve, employed in the method of the invention permits the injection of a wide variety of solutions and compositions with different concentrations formed, for example, from different types of liquid hydrocarbons or different types of liquid nitrogen compounds, and rapid growth of the nanotubes.

The technique for introducing liquids such as solutions into a reaction chamber in the form of finely divided liquid particles, for example droplets, with the aid of the specific injection system according to the invention is controllable, reliable, reproducible and much more flexible than the techniques listed above, which employ a syringe, a sprayer or an ultrasonic nebulizer. The flexibility of this technique makes it possible, in particular, to use solutions consisting of volatile carbon-containing liquids less toxic than benzene, although it still remains possible to use the latter.

In other words, the essential advantages associated with the injection system employed in the method of the invention compared with the previous systems used for injecting liquids and converting them into droplets, which are specifically formulated for the preparation of carbon nanotubes, are in particular as follows:

isolation between the "upstream" part of the method, for example the chamber for storing the liquid such as a solution, and the optional evaporator and the heated reaction chamber;

possibility of operating with a controlled pressure in the reaction chamber, which pressure may be less than atmospheric pressure;

possibility of using highly volatile liquids or less volatile and/or more viscous liquids;

possibility of using different types of solutions with variable concentrations and even, surprisingly, the possibility of using colloidal suspensions of metal particles in which the size of the particles is generally less than 30 microns (see below);

generation of droplets with a well-defined volume;

control of the liquid flow rate in a wide range, and independently of the carrier gas flow rate;

reproducible liquid flow rate.

All types of liquid hydrocarbons or liquid nitrogen compounds may be used in the method of the invention: in fact, the specific injection system employed according to the invention surprisingly makes it possible to use any liquid based on any types of liquid hydrocarbons or liquid nitrogen compounds, even liquids which have never before been used for this purpose or even envisaged for it.

Advantageously, the liquid hydrocarbon (or the liquid hydrocarbons if there are more than one of them) is selected from liquid (at normal temperature) nonaromatic hydrocarbons.

Examples which may be mentioned among the nonaromatic hydrocarbons that are liquid at room temperature include: C5 to C20 alkanes such as n-pentane, isopentane, hexane, heptane and octane; C5 to C20 liquid alkenes; C4 to C20 liquid alkynes; and C5 to C15 cycloalkanes such as cyclohexane.

These nonaromatic liquid hydrocarbons, and in particular hexane, heptane and cyclohexane, are more volatile than the optionally substituted aromatic liquid hydrocarbons such as benzene, toluene and xylene, and can therefore be used for the first time in the method of preparing carbon nanotubes according to the invention, by virtue of the particular injection system which is employed in it.

Conversely, the other systems which generate aerosols are less suitable for the use of volatile liquids.

Furthermore, these liquids have never before been used for the production of nanotubes, in any method whatsoever.

The liquid alkanes and cycloalkanes, such as cyclohexane, have the advantage of a lower toxicity than benzene, which is carcinogenic, and toluene and xylene which are neurotoxic.

Nevertheless, it is also possible to use C6 to C12 aromatic hydrocarbons optionally substituted, for example, with one or more C1 to C6 alkyl groups, such as benzene, toluene and xylene.

The liquid nitrogen compound is preferably selected from liquid amines, for example benzylamine, or nitrites such as acetonitrile.

It is furthermore important to note that the liquid may contain a single hydrocarbon (or nitrogen compound) or a mixture of several hydrocarbons (or nitrogen compounds) in any proportions.

The liquid converted into the form of finely divided liquid particles, for example droplets, is preferably in the form of a solution of the metal compound precursor(s) of a metal in the liquid hydrocarbon(s), said metal acting as a catalyst.

When it is present in the solution, said metal compound precursor of a catalyst metal, also referred to as "precursor of the metal acting as a catalyst", is generally selected from the compounds consisting of carbon, hydrogen, optionally nitrogen and/or oxygen and at least one metal.

Said metal compound precursor of a catalyst metal may be selected, for example, from metal salts and organometallic compounds.

Said metal salts may be selected from metal salts in which the counterion of the metal consists of a heteroatom such as a halogen.

Said metal salts may also be selected from metal nitrates, acetates, acetylacetonates and phthalocyanines, such as iron phthalocyanine and nickel phthalocyanine.

The metal is generally selected from iron, cobalt, nickel, ruthenium, palladium and platinum.

Preferred compounds are ferrocene, nickelocene, cobaltocene and ruthenocene, iron phthalocyanine and nickel phthalocyanine.

The solution may of course consist of either a solid organometallic compound or a mixture of solid compounds, dissolved in the liquid hydrocarbon or the liquid nitrogen compound or in a mixture of liquid hydrocarbons or in a mixture of liquid nitrogen compounds, the only production condition being solubility of the solid product in the liquid in question.

The concentration of the metal compound precursor(s) of a catalyst metal in the solution is generally from 0.2 to 15% by mass.

Particularly advantageous results are obtained with 2.5% by mass solutions of ferrocene, preferably in toluene and/or cyclohexane.

According to another embodiment of the method of the invention, and precisely by virtue of the specific injection system employed in it, the liquid may also be in the form of a colloidal suspension of particles, or more precisely metal nanoparticles, in said at least one liquid hydrocarbon or in said at least one liquid nitrogen compound.

The liquid may furthermore be in the form of a colloidal suspension of particles in which one or more metal precursors such as those mentioned above is (are) also dissolved.

Here again, and similarly as the case in which the liquid is a solution, the suspension liquid acts as a carbon source or carbon and nitrogen source. The liquid may of course consist of one or a mixture of two or more of the liquid hydrocarbons mentioned above. Alternatively, the liquid may consist of one or a mixture of two liquid nitrogen compounds.

The nanoparticles are advantageously selected from nanoparticles of iron, nickel, cobalt, ruthenium, palladium, platinum, etc., and of their mixtures or their alloys: namely alloys of two or more of these metals, with one another or with other metals.

In the case in which the liquid is in the form of a solution, it may furthermore contain one or more compound(s) promoting the growth of the carbon nanotubes or carbon and nitrogen (nitrogen-doped) nanotubes, such as thiophene or precursors of rare earths (such as Y, La, Ce, for example their nitrates or alkoxides).

The finely divided liquid particles such as droplets advantageously have a dimension, for example a diameter, of from a few tenths of micrometers to a few tens of micrometers, preferably from 0.1 to 20 micrometers.

The injection system generally operates in pulses, the number of pulses generally being from 0.9 to 1200 per minute.

In each pulse, furthermore, a volume of liquid is injected whose range varies both as a function of the opening time of the needle valve (generally from 0.5 to 12 ms) and the liquid being used, and on the pressure applied in the reservoir, and this volume may for example be from 2 to 100 microliters.

Optionally, the finely divided liquid particles such as droplets formed by the injection system are evaporated in an evaporation device before they are introduced into the reaction chamber.

Advantageously, the pyrolysis is carried out at a temperature of from 600 to 1100° C., preferably from 800 to 1000° C., more preferably from 800 to 900° C.

Advantageously, the pyrolysis is carried out for a time of from 5 to 60 min, preferably from 15 to 30 minutes. This time clearly varies as a function of the size of the reactor Advantageously, the pressure in the reaction chamber is a controlled pressure, for example less than atmospheric pressure.

The carbon nanotubes or the nitrogen-doped carbon nanotubes may be prepared directly on the walls of the reaction chamber, which thus act as a support for their deposition and their growth. In this case, the liquid should contain a metal compound precursor of a metal acting as a catalyst.

At least one substrate, on which the deposition and growth of the nanotubes take place, may alternatively be placed inside the reaction chamber.

In one embodiment, the liquid does not contain a metal compound precursor of a catalyst metal, and the substrate is provided with a catalyst deposit.

In another embodiment, the liquid contains one or more metal compound precursor(s) of a catalyst metal, and the substrate may or may not be provided with a catalyst deposit.

In other words if the precursor of the metal acting as a catalyst is not contained in the solution, that is to say the liquid being injected consists only of hydrocarbon(s) or nitrogen compound(s), then the substrate will need to contain a deposit of metal catalyst(s), and if the precursor of the metal acting as a catalyst is contained in the solution, that is to say the liquid being injected consists of hydrocarbon(s) or nitrogen compound(s) and metal precursor(s), then the substrate may or may not contain a deposit of metal catalyst(s).

According to the method of the invention, and again essentially by virtue of the specific injection system which it employs, the deposition and growth may be carried out on any type of substrate so long as this substrate can withstand the pyrolysis temperature.

The substrate may be selected, for example, from quartz substrates, silicon substrates and substrates made of metal oxides such as $Al_2O_3$, $Y_2O_3$, $MgO$ and $ZrO_2$.

The substrate may also be a fabric of carbon fibers or nitrogen-doped carbon fibers.

The substrate may be provided with a catalyst deposit prior to the deposition and growth of the nanotubes, in which case the liquid being injected may not contain a metal compound precursor of a metal acting as a catalyst.

Generally, this catalyst deposit comprises one or more metals generally selected from transition metals such as Fe, Ni and Co, and other metals such as Pd, Ru and Pt.

The catalyst deposit may be in the form of a thin film, although it may also be deposited discontinuously.

When the deposit is discontinuous, it may or may not be ordered and may be in the form of a set of discrete entities, for example drops, beads, spots or dots of catalyst.

If the deposit is ordered or organized, said discrete entities are generally arranged in the form of a network or pattern, and it is thus possible to generate carbon nanotubes or nitrogen-doped carbon nanotubes which are also arranged in a network or pattern, for example as a pattern in which the nanotubes are aligned, for example in a regular pattern.

The nanotube patterns which can be obtained on substrates, and which can be tested in field emission, are a network of interconnected lines or rows of nanotubes.

The substrate may also consist of a layer of carbon nanotubes or nitrogen-doped carbon nanotubes or a plurality of stacked layers of nanotubes. In this way, a multilayered structure of nanotubes is created with the method according to the invention.

The invention furthermore relates to a device for carrying out the method as described above, comprising:

a reaction chamber in which carbon nanotubes or nitrogen-doped carbon nanotubes are prepared by pyrolysis of a liquid containing at least one liquid hydrocarbon precursor of carbon or at least one liquid compound precursor of carbon and nitrogen consisting of carbon atoms, nitrogen atoms and optionally hydrogen atoms and/or atoms of other chemical elements such as oxygen, and optionally at least one metal compound precursor of a catalyst metal;

means for forming said liquid under pressure into finely divided liquid particles, such as droplets, for conveying said finely divided particles, such as droplets, by a carrier gas stream and introducing them into the reaction chamber;

in which device said means for forming said liquid into finely divided liquid particles, for conveying them, and introducing them into the reaction chamber comprise a specific injection system, preferably a periodic injection system, provided with an injection head, and a connection ring, in which a carrier gas intake is provided, connecting the injection system to the reaction chamber optionally via an evaporation device.

Advantageously, the side wall of the connection ring includes at least one carrier gas intake tube, said carrier gas intake tube opening into an annular groove surrounding the injection head of the system for injecting the liquid particles, and is placed behind it in order to surround the finely divided liquid particles without interfering with them.

The invention will now be described in more detail in the following description, which is given solely by way of illustration and without implying limitation, and with reference to the appended drawings in which:

(FIG. 3A) and 900° C. (FIG. 3B) for 15 min;

(FIGS. 4C and 4D);

Figure 1:
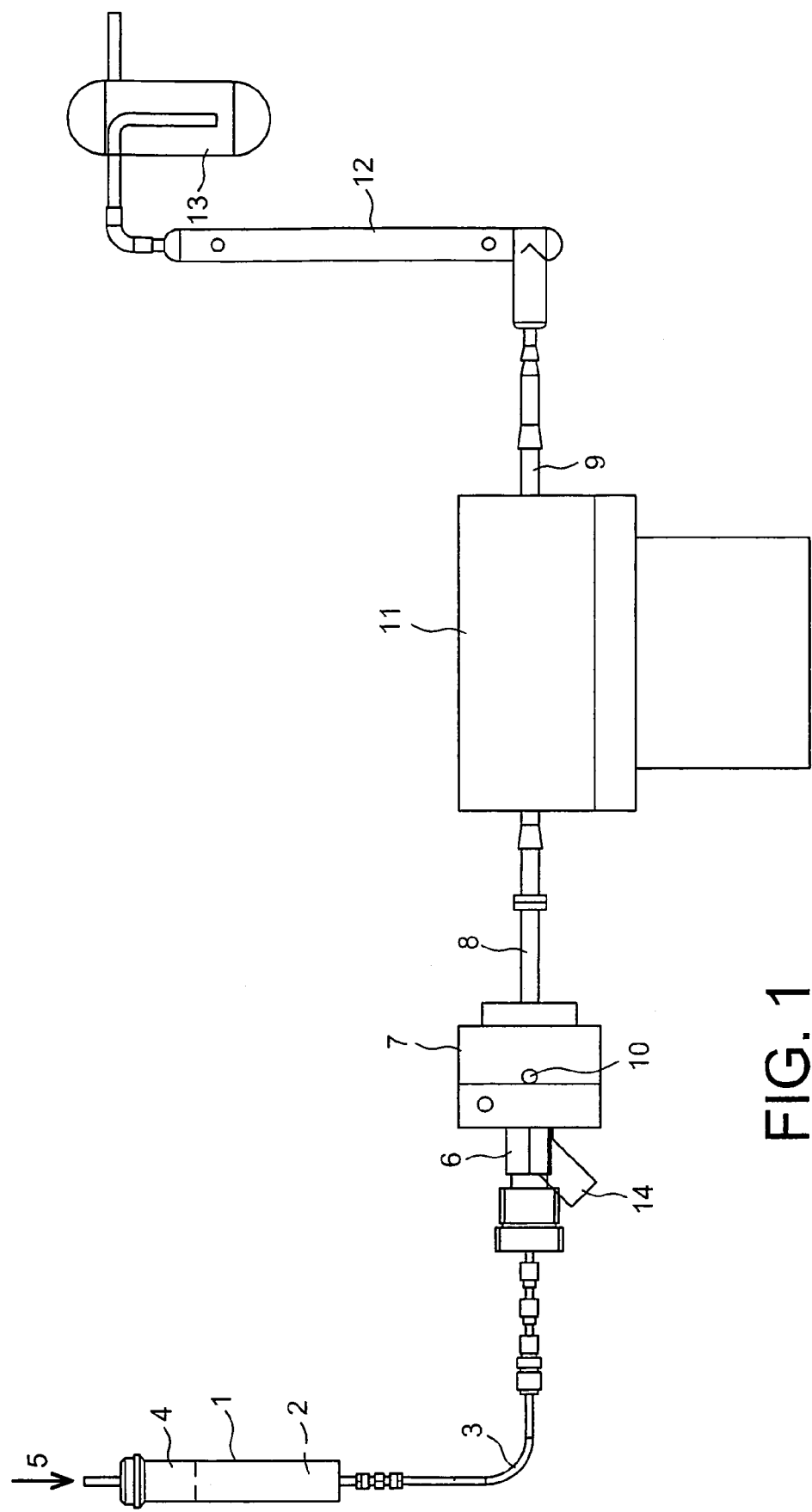
FIG. 1 is a sectional side view of a device for carrying out the method of the invention.

More specifically, the method according to the invention may be carried out, for example, with a device such as that described in FIG. 1.

This device can generally be divided into four or five parts, depending on whether or not it includes an evaporator.

The device firstly comprises means for supplying the injection system with liquid.

In FIG. 1, these means comprise a chamber or reservoir (1), for example made of stainless steel, which contains the liquid (2) and is connected to the inlet of the injection system of the injector via a tube, for example made of Teflon® (3). All of these supply means are intended to be subjectable to a pressure making it possible to convey the liquid to the injector.

This pressure may, for example, result from the introduction of a pressurized gas (5), that is to say one whose pressure is generally from 1 to 5 times atmospheric pressure, into the upper part of the chamber or reservoir, that is to say into the part (4) lying above the liquid level. This gas may be similar to the carrier gas but it need not necessarily be the same gas, although it should be inert and is therefore generally selected from inert gases such as Ar, He, $N_2$, etc.

The chamber or reservoir (1) is intended to be stored at room temperature, or at any temperature which does not lead to reactions in the liquid such as a solution.

The device next comprises injection means (6) which, according to the invention, preferably comprise an injector of the heat engine injector type used in the automobile sector, means for controlling said injector which generally consist of a control unit controlled by a microprocessor system and, lastly, a ring (7) for connecting the injector to an evaporator (8) or directly to the reaction chamber or reactor (9).

Said connection ring comprises a circuit for a coolant such as water, and a carrier gas intake (10).

The carrier gas may be any gas, although it is generally selected from Ar, He, $N_2$, $H_2$ etc. or their mixtures. The carrier gas is preferably argon or a mixture of argon and hydrogen.

The injection system preferably operates in a pulsed mode, and makes it possible to inject a set of droplets with a given volume each time it is actuated.

For example, from 0.9 to 1200 injections may be carried out per minute, each injection making it possible to inject a mass of liquid that varies with the opening time of the needle valve and the liquid being used, and the volume of the droplets also varies with these same parameters.

For the injection to be possible, it is necessary for the pressure above the liquid level located in the reservoir or storage chamber (1) to be greater than that in the evaporator (8) or the reactor (9).

According to the invention, the injector is composed of a needle-type valve which has its opening time and frequency controlled. For example, the opening time is generally from 0.5 to 12 milliseconds and the opening frequency is from 0.016 to 20 Hz.

The opening time furthermore makes it possible to control the volume of the droplets, and the total injection time is fixed by the injection frequency and the number of pulses.

For example, the total injection time is generally from 5 to 60 minutes.

The use of such a specific injection system has a large number of advantages, which have already been listed above.

In FIG. 1, the injector (6) and connection ring (7) assembly is represented in cross section, with the take-off (14) providing an outlet to a microprocessor control unit (not shown) and an orifice (10) providing a carrier gas intake.

Figure 2:
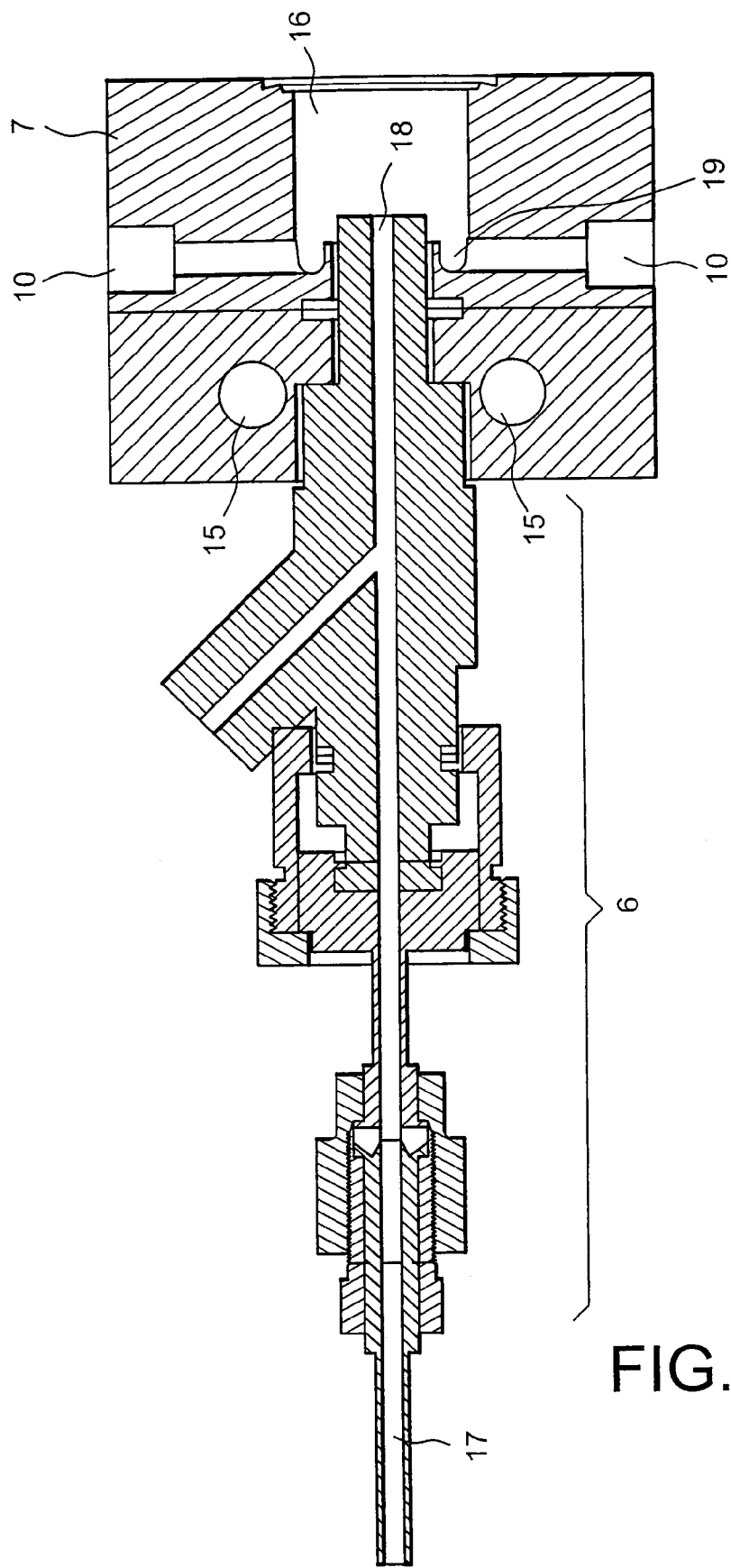
FIG. 2 is a sectional side view of the injection system employed in the method of the invention, provided with a connection ring.

FIG. 2 is an enlarged top view in section of the injector (6) and connection ring (7) assembly, showing the carrier gas intake (10) and the bores (15) for circulation of the cooling water. The connection ring (7) is connected at (16) to the evaporator.

The carrier gas intake (10) level with the connection ring is designed so as not to interfere with the set of droplets emitted by the injector (18). It consists of a circular, or rather annular, groove or gutter (19) located behind the injection head (18) (in the drawing, this is the notch onto which the conduit 10 opens).

In this injector (6) and connection ring (7) assembly, the solution or suspension which arrives under pressure via the pipeline (17) is converted into a finely divided form in the injector (6), for example into the form of droplets, and these droplets are emitted at (18) by the injection head of the injection system into the evaporator, and conveyed to the reactor by the carrier gas introduced at (10), then distributed by the groove 19 surrounding the injection head. The carrier gas thus surrounds the finely divided particles without interfering with them.

The device in FIG. 1 may optionally comprise evaporation means which, for example, may be in the form of a heated metal tube (8) placed before the reaction chamber. The purpose of this evaporation system is to evaporate the droplets emitted by the injector.

This evaporation system is optional, insofar as it is not necessary under all operating conditions. In particular when the delivery rates of injected solution are small compared with the volume capacity of the reactor and the carrier gas delivery rate, then it is not absolutely necessary to use the evaporator.

Another part of the device in FIG. 1 for carrying out the method of the invention is located by the reaction chamber which is provided with means for bringing it to the pyrolysis temperature of the liquid being injected.

The reaction chamber or reactor (9) generally has a tubular shape and is generally made of a material such as quartz, alumina or any other material which can withstand the temperature range 600-1100° C.

These means for bringing the reaction chamber to the pyrolysis temperature generally comprise a furnace (11), for example a tubular furnace or a furnace with a square cross section, in which the reaction chamber (9) is placed.

The furnace (11) is generally controlled by a temperature programmer.

The last part of the device in FIG. 1 is the part for discharging the gases, and it is for example composed of a system for cooling the gases (12) produced by the reactions which take place in the reaction chamber, followed by a trap (13) cooled to the temperature of ice and an acetone bubbler.

As a variant, the trap (13) may be replaced by a filter system.

An operating protocol for carrying out the method according to the invention with the device in FIG. 1 may be as follows:

the chamber or reservoir (1) is filled with the liquid (the solution or colloidal suspension) (2) prepared beforehand, as described above;

the carrier gas (5) is introduced into the device;

it has been seen that the most commonly used gas is argon or an argon/hydrogen mixture;

the furnace (11) is then subjected to a temperature rise program in order to reach the ideal temperature range, which lies between 700 and 1100° C.;

as soon as the furnace (11) has reached the intended temperature, the injector (6) is actuated;

the operation of the device may be stopped after very short times, for example of the order of 15 minutes, or it may be continued for longer, depending on the capacity of the reactor.

The operating or production time is dictated not only by the capacity of the reactor, but also by the degree of cleanness intended for the nanotubes produced as a function of time, that is to say the quality of the nanotubes may possibly be degraded after a certain production time.

The long aligned nanotubes produced by the method of the invention can be used in a wide variety of fields, such as mechanical reinforcement of various matrices, for example polymer, ceramic or metal matrices.

They may also make materials more functional, for example impart conduction or magnetism properties to certain polymers.

The nanotubes produced by the method of the invention, which are aligned perpendicularly to substrates, can be used as field emission sources, for example in flat screen devices. Lastly, a final field or these materials may be employed is that of new energy technologies, for example electrodes for fuel cells.

The invention will now be described with reference to the following examples, which are given by way of illustration and without implying any limitation.

In these examples, carbon nanotubes are prepared by the method of the invention while operating with the installation as described in FIG. 1.

EXAMPLES

Example 1

In this example, aligned nanotubes are prepared directly in the reactor from solutions of ferrocene in toluene.

The liquid hydrocarbon which is used is toluene, and the precursor of the metal (Fe) acting as a catalyst is ferrocene.

The solid ferrocene is dissolved in the toluene with the aid of an ultrasonic vessel. The resulting solution is then poured into the liquid chamber and an argon pressure of 1 bar is applied in order to propel the liquid toward the injector.

Example 1A

The solution is a 5% by mass solution of ferrocene.

2701 droplet injections are carried out at a frequency of 180 injections per minute. The opening time of the needle valve is 0.75 millisecond. The experiment therefore lasts 15 minutes and the mass of solution injected is 9 grams, that is to say about 0.135 gram of iron acting as a catalyst. The carrier gas is argon with a delivery rate of 1 liter per minute.

Two pyrolysis temperatures are tested: 850 and 900° C. In both cases, a carbon-based deposit is obtained on the walls of the reactor and the mass of product is more than 1 gram. The mass of product obtained increases with the temperature: it is 1.141 g at 850° C. and 1.500 g at 900° C. This result implies a very high yield of carbon-based product with respect to the initial mass of Fe catalyst. The yield thus changes from 744 to 1009% when the temperature changes from 850 to 900° C.

The scanning electron microscopy observations show the presence of webs, sheets of nanotubes aligned like a carpet. The thickness of these webs, sheets, that is to say the length of the nanotubes, increases when the pyrolysis temperature increases: it is about 150 microns at 850° C. and about 400 microns at 900° C. The growth rates at these two pyrolysis temperatures are respectively 10 μm/min and 27 μm/min. The transmission electron microscopy observations of the individual nanotubes demonstrate the multi-wall structure. Under the synthesis conditions given above, a small proportion of byproducts in the form of carbon-based particle aggregates remains in the carbon-based product.

Figure 3A:
FIGS. 3A and 3B are micrographs taken by scanning electron microscopy of the carbon-based products, as collected after the synthesis and obtained from a 5% strength solution of ferrocene in toluene, pyrolyzed at 850° C.

The micrograph in FIG. 3A relates to the carbon-based products as collected after the synthesis, obtained by pyrolyzing a solution as described above at 850° C. It shows the entire sample consisting of several stacks of aligned nanotubes, resembling "pieces of carpet".

Figure 3B:
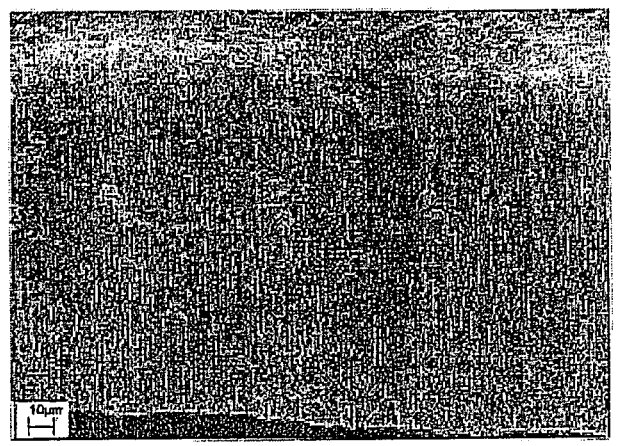

The micrograph in FIG. 3B relates to the carbon-based products, as collected after the synthesis obtained by pyrolyzing the solution described above at 900° C., and it shows the edge of a stack of aligned nanotubes with a few particle aggregates.

Example 1B

The solution is a 2.5% by mass solution of ferrocene.

1-2566 droplet injections are carried out at a frequency of 171 injections per minute. The opening time of the needle valve is 0.75 millisecond. The experiment therefore lasts 15 minutes and the mass of solution injected is 8 grams, that is to say about 0.06 gram of iron acting as a catalyst. The carrier gas is argon with a delivery rate of 1 liter per minute.

Three pyrolysis temperatures are tested: 800, 850 and 900° C. In all three cases, a carbon-based deposit is obtained on the walls of the reactor and the mass of product increases with the pyrolysis temperature (from 272 mg to 1.029 g). This result implies a very high yield of carbon-based product with respect to the initial mass of Fe catalyst, which varies between 353 and 1615% when the temperature changes from 800 to 900° C.

As in the case of Example 1A, the scanning electron microscopy observations demonstrate the presence of aligned nanotubes webs, sheets. It is important to note the negligible quantity or even virtual absence of byproducts, in contrast to the case of Example 1A.

The thickness of these webs, sheets, that is to say the length of the nanotubes, increases when the pyrolysis temperature increases: it is about 100 microns at 800° C., 280 microns at 850° C. and 400 microns at 900° C.

The growth rates at these three pyrolysis temperatures are respectively 7 μm/min, 19 μm/min and 27 μm/min. They are also multi-wall (multileaflets) nanotubes.

The micrographs in FIGS. 4A to 4D relate to the carbon-based products as collected after the synthesis obtained by pyrolyzing a 2.5% strength solution of ferrocene in toluene.

Figure 4A:
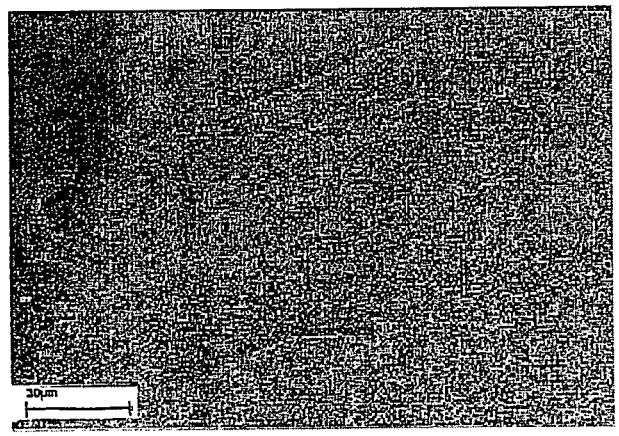
FIGS. 4A, 4B, 4C and 4D are micrographs taken by scanning electron microscopy of the carbon-based products, as collected after the synthesis and obtained from a 2.5% strength solution of ferrocene in toluene, pyrolyzed at 800° C. for 15 min (FIGS. 4A and 4B) and 850° C.

The micrograph in FIG. 4A, for which the synthesis was carried out at 800° C., represents the edge of a stack of aligned and "clean" nanotubes with a virtual absence of byproducts.

Figure 4B:
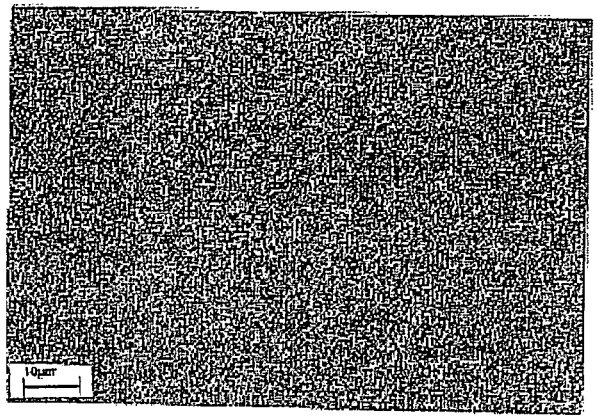

The micrograph in FIG. 4B, for which the synthesis was carried out at 800° C., represents the surface of a stack of aligned nanotubes, with the end of the nanotubes pointing upward.

Figure 4C:
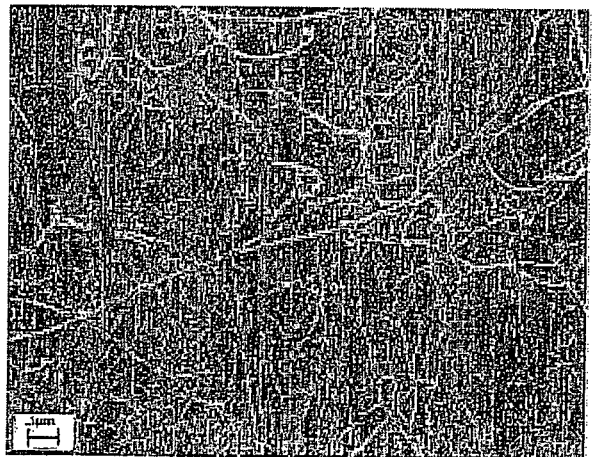

The micrograph in FIG. 4C, for which the synthesis was carried out at 850° C., is a high-magnification micrograph of the edge of a stack of aligned nanotubes, confirming the virtual absence of byproducts.

Figure 4D:
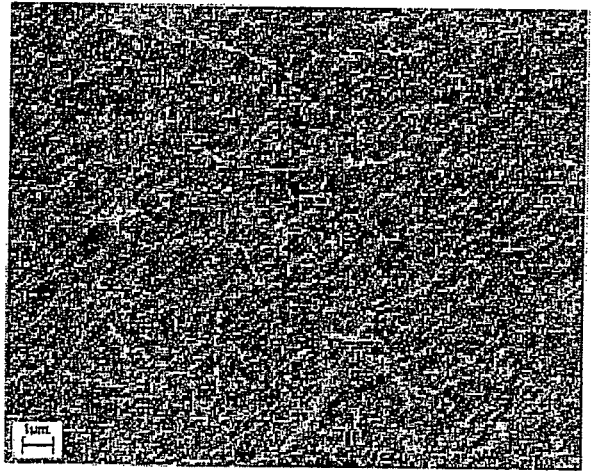

The micrograph in FIG. 4D, for which the synthesis was carried out at 850° C., is a high-magnification micrograph of the surface of a stack of aligned nanotubes, showing the end of the nanotubes pointing upward and the surface cleanness.

2—Under the same conditions as before, an experiment is carried out while omitting the evaporator part from the experimental device. The pyrolysis temperature is fixed at 850° C.

The mass of product obtained is 736 mg, and the yield with respect to the initial mass of catalyst increases without an evaporator (1127% compared to 840% with the evaporator).

The nanotubes obtained are still aligned like a carpet, and the virtual absence of byproducts can be seen. The thickness of the nanotubes webs, sheets is about 380 microns. The growth rate is 25 μm/min.

Figure 5A:
FIGS. 5A and 5B are micrographs taken by scanning electron microscopy of the carbon-based products, as collected after the synthesis and obtained from a 2.5% strength solution of ferrocene in toluene, pyrolyzed at 850° C. for 15 min without an evaporator.
Figure 5B:
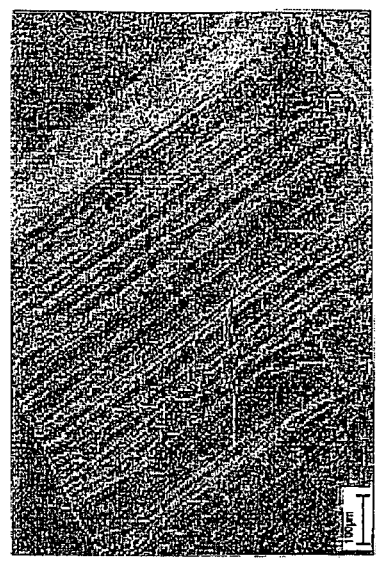

The micrographs in FIGS. 5A to 5B, taken by scanning electron microscopy, relate to the carbon-based products as collected after the synthesis and obtained by pyrolyzing a 2.5% strength solution of ferrocene in toluene at 850° C., without using an evaporator.

The micrograph in FIG. 5A gives an overall appearance of the sample, showing stacks of aligned nanotubes free of byproducts.

The micrograph in FIG. 5B shows the surface, which can be termed very clean, of a stack of aligned nanotubes pointing upward.

3—An experiment was carried out with the same 2.5% strength solution of ferrocene while modifying the injection parameters, namely 5132 droplet injections at a frequency of 171 injections per minute. The opening time of the needle valve is 0.75 millisecond. The experiment therefore lasts 30 minutes and the mass of solution injected is 16 grams, that is to say about 0.12 gram of iron acting as a catalyst. The carrier gas is argon with a delivery rate of 1 liter per minute. The pyrolysis temperature is fixed at 850° C.

As in the case of the previous experiments, the yield with respect to the initial mass of catalyst remains high, namely: 1351%, and the mass of product obtained reaches 1.741 g. The scanning electron microscopy observation shows webs, sheets of aligned nanotubes containing a very high proportion of nanotubes, that is to say virtually free of byproducts. The thickness of the webs, sheets is furthermore extremely high, since it can reach 1 mm, and the degree of alignment of the nanotubes in the sheets is very great. The growth rate is 33 μm/min.

Figure 6A:
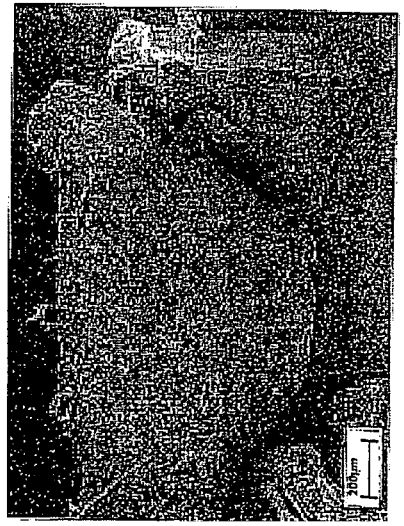
FIGS. 6A and 6B are micrographs taken by scanning electron microscopy of the carbon-based products, as collected after the synthesis and obtained from a 2.5% strength solution of ferrocene in toluene, pyrolyzed at 850° C. for 30 min without an evaporator.
Figure 6B:
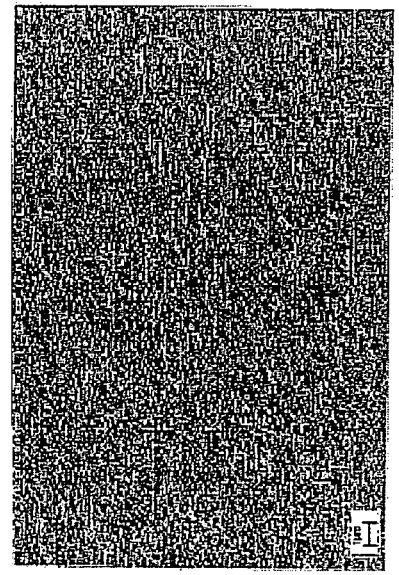

The micrographs in FIGS. 6A and 6B relate to the carbon-based products as collected after the synthesis and obtained by pyrolyzing a 2.5% strength solution of ferrocene in toluene at 850° C., without using an evaporator.

The micrograph in FIG. 6A gives an overall appearance of the sample, showing stacks of aligned nanotubes free of byproducts.

The micrograph in FIG. 6B shows the edge of a stack of aligned nanotubes, which can be termed as clean.

Example 2

In this example, aligned nanotubes are prepared directly in the reactor from solutions of ferrocene in xylene.

The liquid hydrocarbon which is used is xylene, and the precursor of the metal (Fe) acting as a catalyst is ferrocene. The solid ferrocene is dissolved in the xylene with the aid of an ultrasonic vessel. The resulting solution is then poured into the liquid chamber (see FIG. 1) and an argon pressure of 1 bar is applied in order to propel the liquid toward the injector.

Example 2A

The solution is a 5% by mass solution of ferrocene.

2701 droplet injections are carried out at a frequency of 180 injections per minute. The opening time of the needle valve is 0.75 millisecond. The experiment therefore lasts 15 minutes and the mass of solution injected is 10.5 grams, that is to say about 0.158 gram of iron acting as a catalyst. The carrier gas is argon with a delivery rate of 1 liter per minute.

The pyrolysis temperature is 850° C. A carbon-based deposit is obtained on the walls of the reactor, and the mass of product is 1.063 gram. This result implies a 574% yield of carbon-based product with respect to the initial mass of Fe catalyst.

The scanning electron microscopy observations show the presence of webs, sheets of nanotubes aligned like a carpet. The thickness of these webs, sheets, that is to say the length of the nanotubes, is about 150 microns. The growth rate is 10 μm/min. Under the synthesis conditions given above, a small proportion of byproducts in the form of carbon-based particle aggregates remains in the carbon-based product.

Figure 7:
FIG. 7 is a micrograph taken by scanning electron microscopy of the entire sample obtained from a 5% strength solution of ferrocene in xylene, pyrolyzed at 850° C. for 15 min.

The micrograph in FIG. 7, taken by scanning electron microscopy, shows the entire sample which is obtained after the synthesis and which is in the form of stacks of aligned nanotubes.

Example 2B

The solution is a 2.5% by mass solution of ferrocene.

2701 droplet injections are carried out at a frequency of 180 injections per minute. The opening time of the needle valve is 0.75 millisecond. The experiment therefore lasts 15 minutes and the mass of solution injected is 11.2 grams, that is to say about 0.084 gram of iron acting as a catalyst. The carrier gas is argon with a delivery rate of 1 liter per minute.

The pyrolysis temperature is 850° C. The mass of carbon-based deposit obtained on the walls of the reactor is 1.096 gram. This result implies a 1205% yield of carbon-based product with respect to the initial mass of Fe catalyst.

The thickness of the nanotube sheets observed by scanning electron microscopy is about 200 microns. The growth rate is 13 μm/min. A small proportion of byproducts still remains in the carbon-based product in this case, although it is less than in the case of the synthesis conditions mentioned in Example 2A.

Example 3

In this example, aligned nanotubes are prepared directly in the reactor from solutions of ferrocene in cyclohexane.

The liquid hydrocarbon which is used is cyclohexane, and the precursor of the metal (Fe) acting as a catalyst is ferrocene. The solid ferrocene is dissolved in the cyclohexane with the aid of an ultrasonic vessel. The resulting solution is then poured into the liquid chamber (see FIG. 1) and an argon pressure of 1 bar is applied in order to propel the liquid toward the injector.

Example 3A

The solution is a 5% by mass solution of ferrocene.

2701 droplet injections are carried out at a frequency of 180 injections per minute. The opening time of the needle valve is 0.75 millisecond. The experiment therefore lasts 15 minutes and the mass of solution injected is 9.1 grams, that is to say about 0.137 gram of iron acting as a catalyst. The carrier gas is argon with a delivery rate of 1 liter per minute.

The pyrolysis temperature is 850° C. The mass of carbon-based deposit obtained on the walls of the reactor is 691 mg. This result implies a 406% yield of carbon-based product with respect to the initial mass of Fe catalyst.

The scanning electron microscopy observations show the presence of sheets, webs, of nanotubes aligned like a carpet. The thickness of these sheets, that is to say the length of the nanotubes, is about 200 microns. The growth rate is 13 μm/min. Under the synthesis conditions given above, a small proportion of byproducts in the form of carbon-based particle aggregates, distributed over the surface or over the edges of the nanotube sheets, webs, remains in the carbon-based product.

Figure 8A:
FIGS. 8A and 8B are micrographs taken by scanning electron microscopy, respectively of the entire sample and the edge of a stack of nanotubes obtained from a 5% strength solution of ferrocene in cyclohexane, pyrolyzed at 850° C. for 15 min.

The micrograph in FIG. 8A, taken by scanning electron microscopy, shows the entire sample which is in the form of stacks of aligned nanotubes.

Figure 8B:
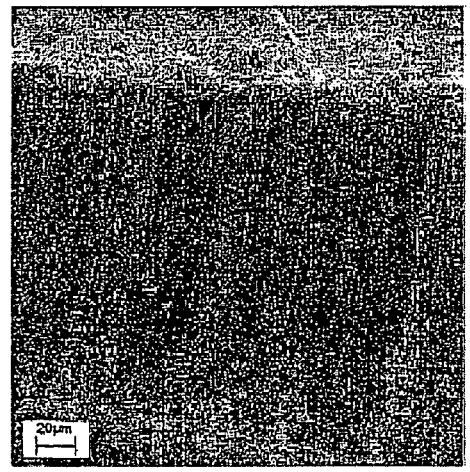

The micrograph in FIG. 8B shows the edge of a stack of aligned nanotubes, containing a small quantity of byproducts in the form of particle aggregates.

Example 3B

The solution is a 2.5% by mass solution of ferrocene.

2701 droplet injections are carried out at a frequency of 180 injections per minute. The opening time of the needle valve is 0.75 millisecond. The experiment therefore lasts 15 minutes and the mass of solution injected is 8.6 grams, that is to say about 0.064 gram of iron acting as a catalyst. The carrier gas is argon with a delivery rate of 1 liter per minute.

The pyrolysis temperature is 850° C. The mass of carbon-based deposit obtained on the walls of the reactor is 1.168 gram. This result implies a 1710% yield of carbon-based product with respect to the initial mass of Fe catalyst.

The nanotube webs, sheets observed by scanning electron microscopy are extremely "clean", that is to say virtually free of byproducts, and their thickness can reach 950 microns. The growth rate is 63 μm/min.

Figure 9A:
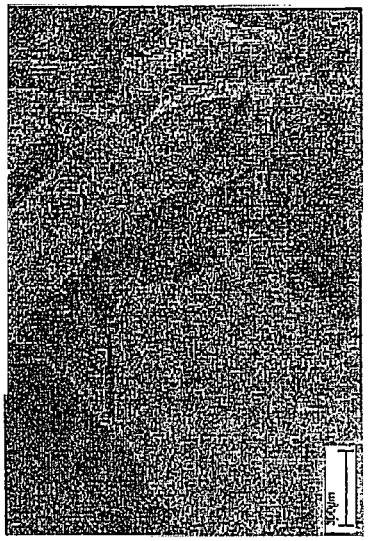
FIGS. 9A to 9D are micrographs taken by scanning electron microscopy of nanotubes virtually free of byproducts and obtained from a 2.5% strength solution of ferrocene in cyclohexane, pyrolyzed at 850° C. for 15 min.
Figure 9B:
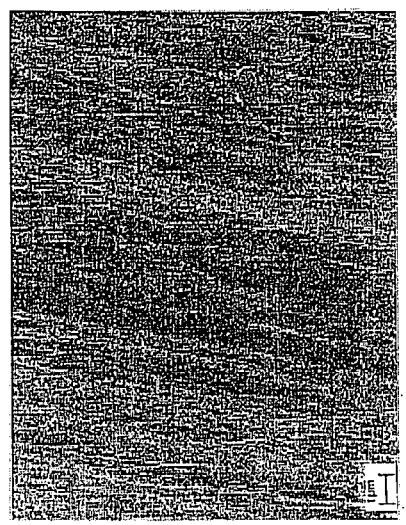
Figure 9C:
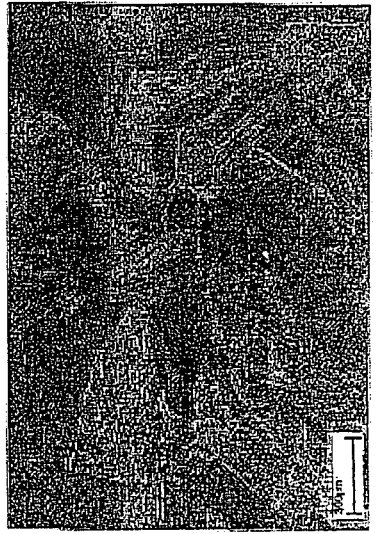
Figure 9D:
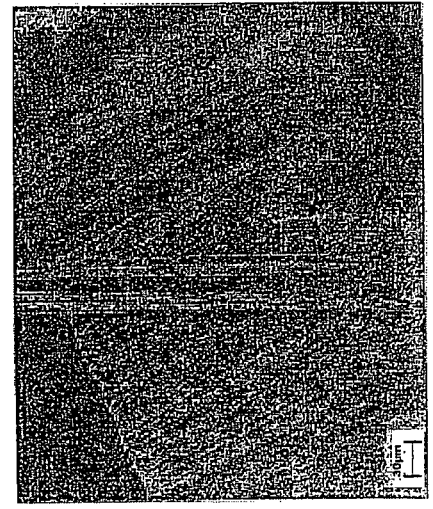

The micrographs in FIGS. 9A to 9D, taken by scanning electron microscopy, respectively show: the entire sample which is in the form of stacks of very clean aligned nanotubes (FIGS. 9A and 9B), the edge of a stack of aligned nanotubes virtually free of byproducts (FIG. 9C), and lastly the high degree of alignment of the nanotubes in the edge of a stack of nanotubes (FIG. 9D).

Figure 9E:
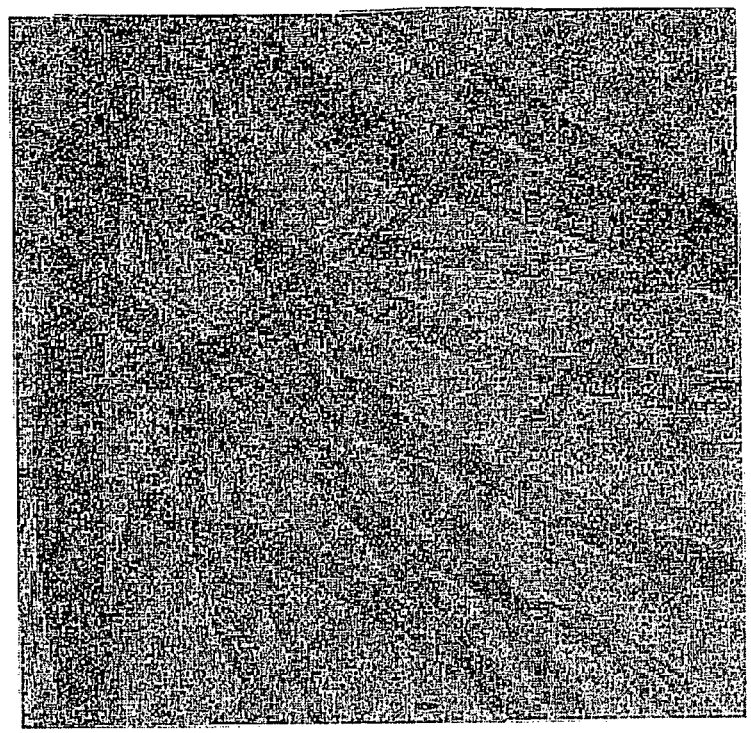
FIGS. 9E and 9F are micrographs taken by transmission electron microscopy of nanotubes obtained from a 2.5% strength solution of ferrocene in cyclohexane, pyrolyzed at 850° C. for 15 minutes.
Figure 9F:
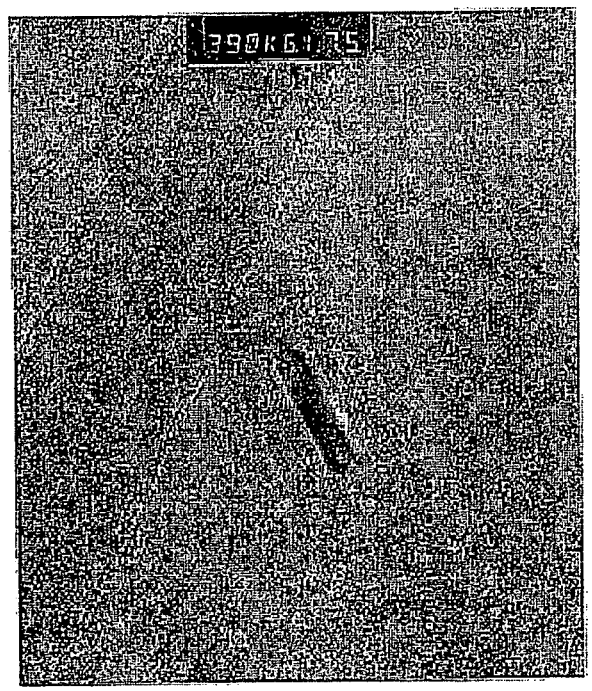

The characterization of the products obtained by using the method of the invention according to this example was carried out by performing analyses with transmission electron microscopy (TEM), high-resolution transmission electron microscopy (HRTEM) and ray diffraction (XRD) analyses. These analyses, and in particular the frames taken by transmission electron microscopy (FIGS. 9E to 9F) show that the nanotubes are very straight compared with the set of nanotubes produced by a conventional CVD method, and that they have a well-defined structure with few defects.

Conclusion

In view of the various tests carried out in Examples 1 to 3, it seems that the solutions containing 2.5% ferrocene make it possible to produce the cleanest and best-aligned nanotubes, irrespective of the hydrocarbon being used.

Furthermore, the length can be controlled in particular by the duration and pyrolysis temperature and by the nature of the liquid hydrocarbon being used. For instance, the pyrolysis of 2.5% strength ferrocene solutions in toluene for 30 min and 2.5% strength ferrocene solutions in cyclohexane for 15 min make it possible to produce very long nanotubes (of the order of one millimeter) which are extremely clean.

Example 4

In this example, nanotubes are prepared on substrates from solutions of ferrocene in toluene.

The liquid hydrocarbon which is used is toluene, and the precursor of the metal (Fe) acting as a catalyst is ferrocene at a level of 2.5% in the solution. The solid ferrocene is dissolved in the toluene with the aid of an ultrasonic vessel. The resulting solution is then poured into the liquid chamber (see FIG. 1) and an argon pressure of 1 bar is applied in order to propel the liquid toward the injector.

Example 4A

Growth on quartz and silicon substrates.

The quartz or silicon substrates have a square cross section of about 1×1 cm. They are preferably placed in the pyrolysis reactor.

2566 droplet injections are carried out at a frequency of 171 injections per minute. The opening time of the needle valve is 0.75 millisecond. The experiment therefore lasts 15 minutes and the mass of solution injected was 8 grams, that is to say about 0.06 gram of iron acting as a catalyst. The carrier gas is argon with a delivery rate of 1 liter per minute.

The pyrolysis temperature is 850° C. A carbon-based deposit is obtained both on the walls of the reactor and on the quartz or silicon substrate. To the naked eye, this deposit seems relatively homogeneous.

The scanning electron microscopy observations show that the carbon-based deposit consists of nanotubes aligned perpendicularly to the quartz or silicon substrate. The degree of alignment is high, and the nanotubes are virtually free of byproducts. The thickness of the sheet of nanotubes deposited on the substrates is about 370 microns. The growth rate is 24 μm/min.

Figure 10:
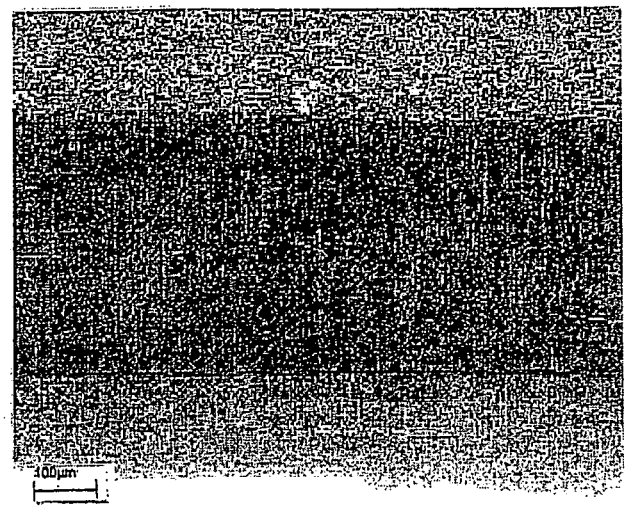
FIG. 10 is a micrograph taken by scanning electron microscopy of nanotubes aligned perpendicularly to the quartz substrate and obtained from a 2.5% strength solution of ferrocene in toluene, pyrolyzed at 850° C. for 15 min.

The micrograph in FIG. 10, taken by scanning electron microscopy, shows the nanotubes aligned perpendicularly to the surface of a quartz substrate.

Example 4B

Growth on carbon fiber fabrics.

The carbon fiber fabric with a square cross section of about 1×10 cm is first placed in the pyrolysis reactor.

The injection and pyrolysis parameters are identical to those mentioned in Example 4A. A carbon-based deposit is obtained both on the walls of the reactor and at the surface of the carbon fabric. To the naked eye, this deposit seems relatively homogeneous.

The scanning electron microscopy observations show the formation of "nodules" both at the surface of the fibers and also in the inter-fiber spaces. These "nodules" are composed of entangled nanotubes and a few particles.

Figure 11A:
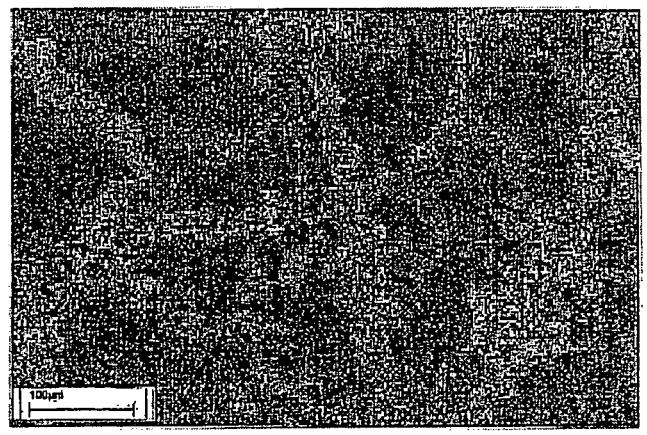
FIGS. 11A and 11B are micrographs taken by scanning electron microscopy of nanotubes deposited on carbon fiber fabrics from a solution of ferrocene in toluene, pyrolyzed at 850° C.
Figure 11B:

The micrographs in FIGS. 11A and 11B, taken by scanning electron microscopy, show entangled nanotubes deposited at the surface of the fibers or in the inter-fiber spaces.

Conclusion

Example 4 shows that it is therefore possible to grow aligned and "clean" nanotubes on quartz or silicon substrates.

It is also possible to grow nanotubes on carbon fiber fabrics, and in particular on the fibers, without any prior impregnation with metal catalyst. This result is promising with a view to developing carbon/carbon composites in which the interface at the fibers or the inter-fiber spaces is reinforced by carbon nanotubes.

BIBLIOGRAPHY

[1] C. N. R. Rao, R. Sen, B. C. Satishkumar, A. Govindaraj, Chem. Comm, 1998.
[2] B. C. Satishkumar, A. Govindaraj, C. N. R. Rao, Chem. Phys. Lett. 307, 158-162, 1999.
[3] S. Huang, L. Dai, A. W. H. Mau, J. Phys. Chem. B, 103, 4222-4227, 1999.
[4] L. Dai, S. Huang, Patent WO0063115.
[5] N. Grobert et al., Appl. Phys. A, Materials Science and Processing, 2000.
[6] H. Ago et al., Appl. Phys. Lett., Vol. 77 No. 1, 2000.
[7] X. Y. Zhang et al., Materials Science and Engineering, A 308, 9-12, 2001.
[8] C. J. Lee et al., Chem. Phys. Lett, 341, 245-249, 2001.
[9] A. Cao et al., Applied Surface Science, 181, 234-238, 2001.
[10] B. Q. Wei et al., Carbon, 40, 47-51, 2002.
[11] D. Narducci, L. Toselli, P. Milani, Electrochemical Society Proceedings, volume 98-23, 1999.
[12] R. Andrews et al., Chem. Phys. Lett., 303, 467-474, 1999.
[13] R. Kamalakaran et al., Appl. Phys. Lett., Vol. 77 No. 21, 2000.
[14] M. Mayne, N. Grobert, M. Terrones, R. Kamalakaran, M. Ruhle, H. W. Kroto, D. R. M Walton, "Pyrolytic production of aligned carbon nanotubes from homogeneously dispersed benzene-based aerosols" Chem. Phys. Lett. 338, 101. 2001.
[15] N. Grobert, M. Mayne, M. Terrones, J. Sloan, R. E. Dunin-Borkowski, R. Kamalakaran, T. Seeger, H. Terrones, M. Ruhle, D. R. M. Walton, H. W. Kroto, J. L. Hutchison, Chemical Communications 5, 471, 2001.
[16] H. Ago, S. Ohshima, K. Uchida, M. Yumura, J. Phys. Chem. B., Vol. 105, No. 43, 2001.

The invention claimed is:

1. A method for preparing carbon nanotubes or nitrogen-doped carbon nanotubes, comprising pyrolysis, in a reaction chamber, of a liquid containing at least one liquid hydrocarbon precursor of carbon or at least one liquid compound precursor of carbon and nitrogen consisting of carbon atoms, nitrogen atoms and optionally hydrogen atoms and/or atoms of other chemical elements and optionally at least one metal compound precursor of a catalyst metal, wherein said liquid is formed under pressure into finely divided liquid particles by a periodic injection system, and the finely divided particles, formed in this way, are conveyed by a carrier gas stream and introduced into the reaction chamber, where the deposition and growth of the carbon nanotubes or nitrogen-doped carbon nanotubes take place.

2. The method of claim 1, wherein said injection system is an automobile heat engine injector.

3. The method of claim 2, wherein the injection system is provided with a needle valve.

4. The method of claim 1, wherein the nanotubes are regularly disposed or arranged in space, are generally aligned with respect to one another and are substantially perpendicular to the wall of the reaction chamber.

5. The method of claim 1, wherein the nanotubes have a length of from a few micrometers up to a few millimeters.

6. The method of claim 1, wherein said liquid hydrocarbon is selected from nonaromatic liquid hydrocarbons.

7. The method of claim 6, wherein said liquid hydrocarbon is selected from C5 to C20 alkanes; C5 to C20 liquid alkenes; C4 to C20 liquid alkynes; and C5 to C15 cycloalkanes.

8. The method of claim 1, wherein said liquid hydrocarbon is selected from optionally substituted C6 to C12 aromatic hydrocarbons.

9. The method of claim 1, wherein said liquid compound consisting of carbon atoms, nitrogen atoms and optionally hydrogen atoms and/or atoms of other chemical elements is selected from liquid amines or nitriles.

10. The method of claim 1, wherein said liquid is in the form of a solution of the metal compound precursor(s) of a catalyst metal in the liquid hydrocarbons(s) or in the liquid compound(s) consisting of carbon atoms, nitrogen atoms and optionally hydrogen atoms and/or atoms of other chemical elements.

11. The method of claim 10, wherein said metal compound precursor of a catalyst metal is selected from the compounds consisting of carbon, hydrogen, optionally nitrogen and/or oxygen and at least one metal.

12. The method of claim 1, wherein said metal compound precursor of a catalyst metal is selected from metal salts and organometallic compounds.

13. The method of claim 12, wherein said metal salts are selected from metal salts in which the counterion of the metal consists of a heteroatom.

14. The method of claim 12, wherein said metal salts are selected from metal nitrates, acetates, acetylacetonates and phthalocyanines.

15. The method of claim 11, wherein said metal is selected from iron, cobalt, nickel, ruthenium, palladium and platinum.

16. The method of claim 12, wherein said organometallic compound is selected from ferrocene, nickelocene, cobaltocene and ruthenocene.

17. The method of claim 11, wherein the solution also contains one or more compound(s) promoting the growth of the carbon nanotubes or nitrogen-doped carbon nanotubes.

18. The method of claim 11, wherein the concentration of the metal compound precursor of a catalyst metal in the solution is generally from 0.2 to 15% by mass.

19. The method of claim 11, wherein the solution is a 2.5% by mass solution of ferrocene.

20. The method of claim 1, wherein said liquid is in the form of a colloidal suspension of metal nanoparticles in said at least one liquid hydrocarbon or in said at least one liquid compound consisting of carbon atoms, nitrogen atoms and optionally hydrogen atoms and/or atoms of other chemical elements.

21. The method of claim 20, wherein said metal nanoparticles are selected from nanoparticles of iron, nickel, cobalt, ruthenium, palladium, platinum and of their mixtures or their alloys.

22. The method of claim 20, wherein one or more metal compound precursor(s) of a catalyst metal is (are) also dissolved in said colloidal suspension, wherein the one or more metal compound precursor(s) is (are) selected from:
  i) compounds consisting of carbon, hydrogen, optionally nitrogen and/or oxygen and at least one metal;
  ii) metal salts, organometallic compounds;
  iii) metal salts in which the counterion of the metal consists of a heteroatom;
  iv) metal nitrates, metal acetates, metal acetylacetonates, metal phthalocyanines;
  v) compounds consisting of carbon, hydrogen, optionally nitrogen and/or oxygen and at least one metal selected from iron, cobalt, nickel, ruthenium, palladium and platinum;
  vi) ferrocene, nickelocene, cobaltocene and ruthenocene.

23. The method of claim 1, wherein said finely divided liquid particles such as droplets have a dimension of from a few tenths of micrometers to a few tens of micrometers.

24. The method of claim 1, wherein said injection system operates in pulses.

25. The method of claim 24, wherein the number of pulses is from 0.96 to 1200 per minute.

26. The method of claim 24, wherein the volume of liquid injected in each pulse is from 2 to 100 microliters.

27. The method of claim 1, wherein the finely divided liquid particles such as droplets formed by the injection system are evaporated in an evaporation device before they are introduced into the reaction chamber.

28. The method of claim 1, wherein the pyrolysis is carried out at a temperature of from 600 to 1100° C.

29. The method of claim 1, wherein the pyrolysis is carried out for a time of from 5 to 60 min.

30. The method of claim 1, wherein the pressure in the reaction chamber is a controlled pressure.

31. The method of claim 1, wherein the liquid contains a metal compound precursor of a catalyst metal, and the deposition and growth of the nanotubes take place directly on the walls of the reaction chamber.

32. The method of claim 1, wherein the deposition and growth of the nanotubes take place on a substrate placed inside the reaction chamber.

33. The method of claim 32, wherein the liquid does not contain a metal compound precursor of a catalyst metal, and the substrate is provided with a catalyst deposit.

34. The method of claim 32, wherein the liquid contains one or more metal compound precursor(s) of a catalyst metal, and the substrate may or may not be provided with a catalyst deposit.

35. The method of claim 32, wherein the substrate is selected from quartz substrates, silicon substrates and substrates made of metal oxides.

36. The method of claim 32, wherein the substrate is a fabric of carbon fibers or nitrogen-doped carbon fibers.

37. The method of claim 33, wherein the catalyst deposit comprises one or more metals selected from transition metals and other metals.

38. The method of claim 33, wherein the catalyst deposit is in the form of a thin film.

39. The method of claim 33, wherein the catalyst is deposited discontinuously.

40. The method of claim 39, wherein the catalyst deposit is in the form of a set of discrete entities.

41. The method of claim 40, wherein the deposit is ordered and said discrete entities are arranged in the form of a network or pattern.

42. The method of claim 32, wherein the substrate consists of a layer of nanotubes or a plurality of stacked layers of nanotubes.

43. A device for carrying out a method for preparing carbon nanotubes or nitrogen-doped carbon nanotubes, comprising:
  a reaction chamber in which carbon nanotubes or nitrogen-doped carbon nanotubes are prepared by pyrolysis of a liquid containing at least one liquid hydrocarbon precursor of carbon or at least one liquid compound precursor of carbon and nitrogen consisting of carbon atoms, nitrogen atoms and optionally hydrogen atoms and/or atoms of other chemical elements, and optionally at least one metal compound precursor of a catalyst metal;
  means for forming said liquid under pressure into finely divided liquid particles, for conveying said finely divided particles by a carrier gas stream and for introducing said finely divided liquid particles into the reaction chamber;

wherein said means comprises a periodic injection system, said periodic injection system comprises an injection head and a connection ring, said connection ring includes a carrier gas intake component;

and wherein a side wall of the connection ring includes at least one carrier gas intake tube, said carrier gas intake tube opening into an annular groove surrounding the injection head of the injection system, wherein the annular groove is placed behind the injection head such that the carrier gas introduced at the at least one carrier gas intake tube surrounds the finely divided liquid particles without interfering with them.

44. The device of claim 43, further comprising an evaporation device connecting the injection system to the reaction chamber.

* * * * *